(12) United States Patent
Blom

(10) Patent No.: US 7,194,765 B2
(45) Date of Patent: Mar. 20, 2007

(54) CHALLENGE-RESPONSE USER AUTHENTICATION

(75) Inventor: Rolf Blom, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 857 days.

(21) Appl. No.: 10/278,362

(22) Filed: Oct. 22, 2002

(65) Prior Publication Data

US 2003/0233546 A1 Dec. 18, 2003

Related U.S. Application Data

(60) Provisional application No. 60/388,503, filed on Jun. 12, 2002.

(51) Int. Cl.
*H04Q 7/20* (2006.01)
*G06F 15/16* (2006.01)

(52) U.S. Cl. .............................. 726/12; 726/4; 726/21

(58) Field of Classification Search ................ 455/411; 726/12

See application file for complete search history.

(56) References Cited

U.S. PATENT DOCUMENTS

| | | | |
|---|---|---|---|
| 5,241,599 A * | 8/1993 | Bellovin et al. ............. | 713/171 |
| 5,491,750 A | 2/1996 | Bellare et al. | |
| 5,513,245 A * | 4/1996 | Mizikovsky et al. ........ | 455/411 |
| 5,537,474 A * | 7/1996 | Brown et al. ............... | 380/248 |
| 5,668,876 A * | 9/1997 | Falk et al. .................. | 380/271 |
| 5,740,361 A * | 4/1998 | Brown .......................... | 726/5 |
| 6,058,480 A | 5/2000 | Brown | |
| 6,668,166 B1 * | 12/2003 | Kanabar ...................... | 455/411 |
| 7,113,994 B1 * | 9/2006 | Swift et al. ................. | 709/229 |

FOREIGN PATENT DOCUMENTS

WO    WO01 76134 A    10/2001

OTHER PUBLICATIONS

Schneier, B., "Applied Cryptography", 1996, John Wiley and Sons, Inc., 2nd Edition, pp. 52-53.*
Samarakoon et al., "Novel Authentication and Key Agreement Protocol for Low Processing Power and Systems Resource REquirements in Portable Communications Systems", 1999, Institution of Electrical Engineers, pp. 9/1-9/5.*
Brown, "Techniques for Privacy and Authentication in Personal Communication Systems", Aug. 1995, IEEE Personal Communications, pp. 6-10.*
Haverinen H: "EAP SIM Authentication" Internet Draft, Jul. 1, 2002, http://www1.ietf.org/mail-archive/ietf-announce/Current/msg19300.html The whole document.
Arkko J et al: "EAP AKA Authentication" Internet Draft, Jul. 1, 2002, http://www1.ietf.org/mail-archive/ietf-announce/Current/msg19299.html The whole document.

* cited by examiner

*Primary Examiner*—Gilberto Barron
*Assistant Examiner*—William S Powers

(57) ABSTRACT

A challenge-response user-authentication procedure masks an authentication center's expected response (XRES) utilizing a masking function (*f*) and by transmitting a random challenge and a masked expected response (XRES') instead of the XRES to an intermediate party where the actual user authentication takes place. The intermediate party sends the random challenge to the user and recieves a user response (RES) from the user. The intermediate party then generates a masked user response (RES') using the same masking function (*f*) and verifies that RES' corresponds to XRES'.

29 Claims, 11 Drawing Sheets

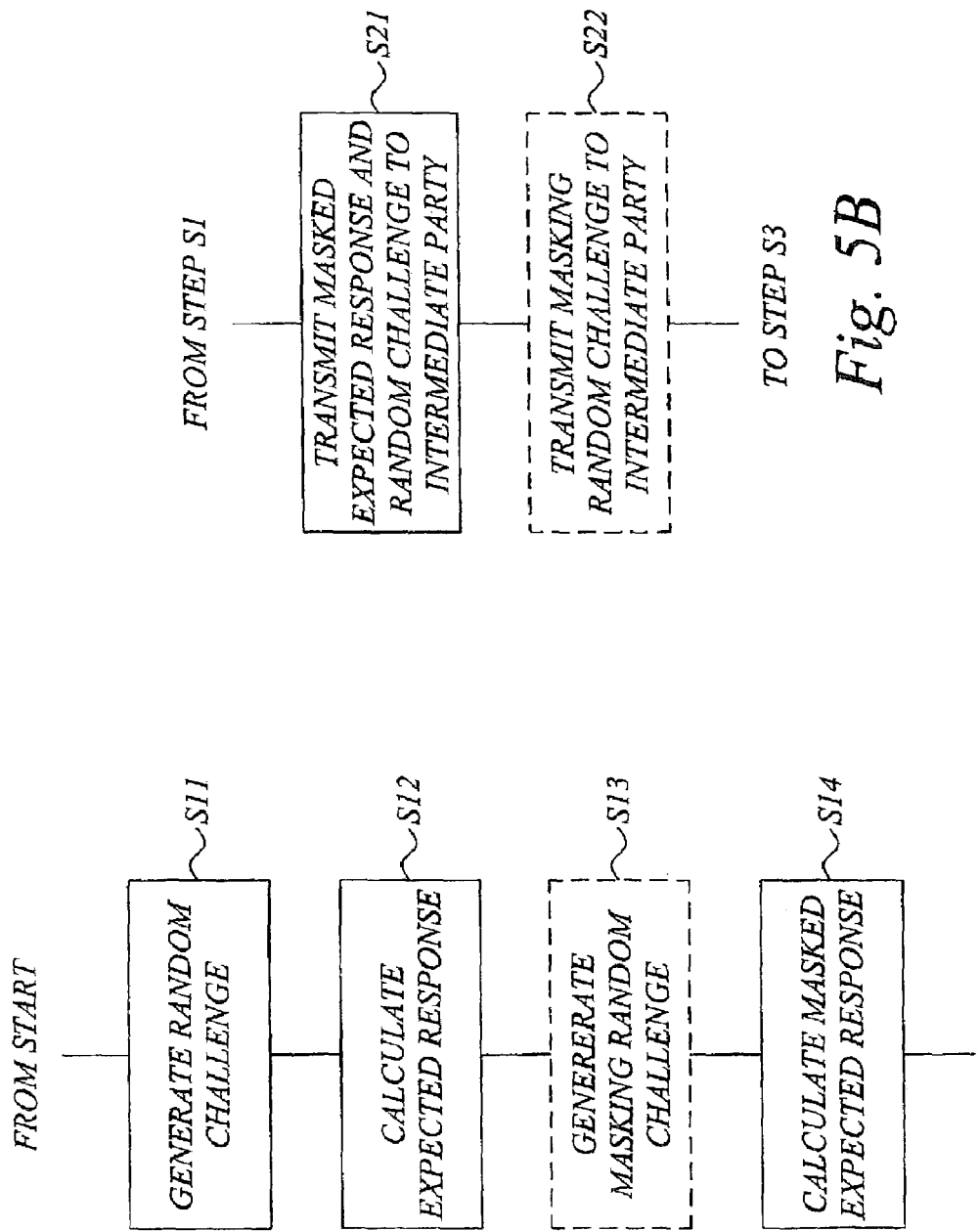

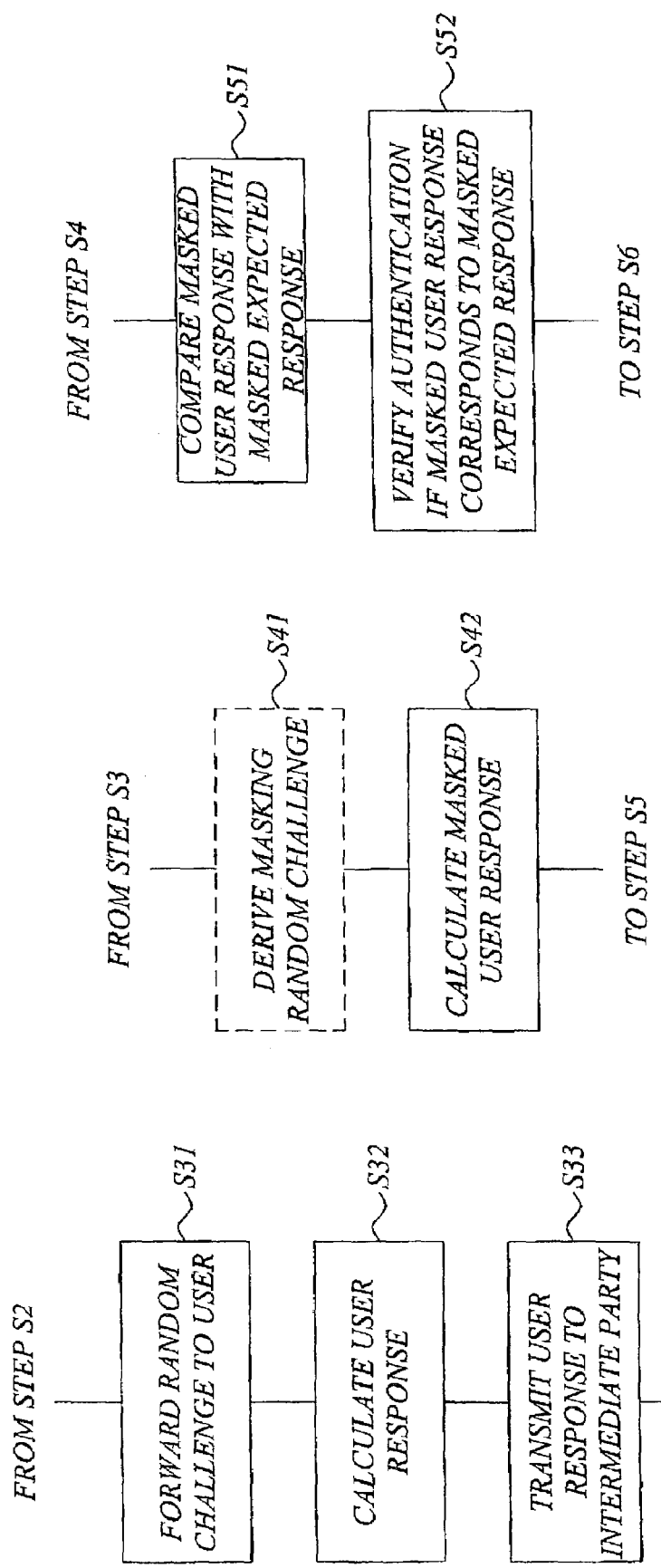

CHALLENGE-RESPONSE USER AUTHENTICATION

This Patent Application claims the benefit of co-pending U.S. Provisional Patent Application Ser. No. 60/388,503, filed on Jun. 12, 2002.

TECHNICAL FIELD OF THE INVENTION

The present invention generally relates to authentication procedures in communication systems, and more particularly to challenge-response user authentication involving a third intermediate party besides the user and the authentication center to which the user is associated.

BACKGROUND OF THE INVENTION

Many communication systems of today, including mobile communication systems, paging systems, as well as wireless and wireline data networks, employ authentication and encryption procedures for the purpose of improving system security and robustness.

In mobile communication systems, for example, users authenticate towards the network and/or service providers in order to gain access to the network services and the authentication also serves as a base for billing the users. The basic security protocol of modern communication systems normally involves a challenge-response authentication procedure, most often based on secret key cryptography. Challenge-response authentication is well known in the art and several standards on basic challenge-response authentication exist, e.g. for GSM (Global System for Mobile Communications) and UMTS (Universal Mobile Telecommunications System) networks.

As illustrated in FIG. 1, a typical scenario in a modern communication system not only involves the user and the authentication center to which the user is associated, but also an intermediate party, such as a separate network operator or other service provider. Typically, the authentication center is related to a home operator with which the user has a trust relation, for example established through a subscription or a pre-paid account. This established trust relation is typically manifested in a cryptographic relationship, for example through a shared secret key (symmetric cryptography). The home operator authentication center, or more specifically the home network operator may have a service agreement with the intermediate party, which agreement is typically manifested by a similar cryptographic relationship. However, the relationship between the user and the intermediate party is normally regarded as an induced trust relationship, which is established when the services offered by the intermediate party are requested or otherwise initiated.

FIG. 2 is a schematic diagram of a typical prior art challenge-response authentication procedure involving a user, an associated home operator authentication center and an intermediate party. For example, the conventional AKA (Authentication and Key Agreement) process used in communication systems such as GSM and UMTS networks includes a challenge-response procedure based on a secret key. The secret key, denoted $K_i$, is normally the subscription key associated with a user-operator subscription or a key derived therefrom. The intermediate party may for example be a network node managing a network into which the user is roaming or other type of service provider offering services in relation to the user.

For authentication of a given user at the intermediate party, the user is normally requested to send a user ID to the intermediate party, which in turn forwards this ID to the home operator authentication center in a request for authentication data. In order to assist in the authentication of the user, the home authentication center generates an expected response XRES based on the secret key $K_i$ associated with this particular user and a random challenge RAND as input to a given function g. Normally, the authentication center may also generate additional information such as a confidentiality key, integrity key and authentication token. In GSM AKA, no integrity key or authentication token is used, but the basic challenge-response procedure is the same. The challenge RAND and the expected response XRES, together with additional information, are sent to the intermediate party, which wants to authenticate the user. The intermediate party forwards the challenge RAND, and possibly the authentication token, to the user. The user, preferably with the help of a subscriber identity module (SIM or USIM), generates a response RES based on the shared secret key $K_i$ (securely stored in the SIM or USIM) and the received challenge RAND as input to the same function g as used by the authentication center. The user then sends the response RES back to the intermediate party. To authenticate the user, the intermediate party simply verifies that the response RES received from the user equals the expected response XRES received from the authentication center.

The transmission of authentication parameters between the authentication center and the intermediate party may be cryptographically protected. In UMTS, for example, the security protocol MAPSec may be used. The MAPSec protocol has been standardized in 3GPP, but not yet deployed.

It is normally required that it should be possible to pre-distribute authentication data and that it should be possible to perform the authentication procedure later without renewed contact with the authentication center.

There are two main threats to the above basic challenge-response authentication procedure. The first threat is that a dishonest intermediate party, such as a separate network operator or other service provider, may request authentication data from the authentication center and later falsely claim that a user has been roaming into the network or otherwise used offered services, and finally request payment for the services. The authentication center can not ask for any supporting proof as the systems of today do not support such a function.

The second threat is that authentication parameters may be intercepted when sent from the authentication center to the intermediate party, or read from a hacked node of the intermediate party. The stolen authentication parameters may then be used to fraudulently authenticate as the user to whom the parameters are associated. Such an attack relies on the ability to steal the authentication data and use them before the real user does. For example, such an attack is possible when a user is roaming between networks and authentication parameters are stored, for later use, in the network that the user is leaving.

RELATED ART

In U.S. Pat. No. 5,596,641, an authentication method of a roaming mobile unit in mobile communication systems is described. The method comprises two stages, a preliminary authentication stage and a main authentication stage. In the preliminary stage, a plurality of pairs of first challenges and expected responses are sent from a home network to a roamed network. Third challenges formed by coupling second challenges and the first challenges are transmitted to the roaming mobile unit, which calculates and transmits responses to the roamed network. In the main authentication stage, the mobile unit is then authenticated using a pair of the second challenges and calculated responses.

A method and apparatus for authenticating a roaming subscriber in a communication system are disclosed in U.S. Pat. Nos. 5,537,474 and 5,668,875. A subscriber and its associated home system use challenges and responses of a home system authentication protocol, and a roamed system uses a corresponding local authentication protocol. The subscriber converts any received challenge from the roamed system to a format compatible with the home system protocol. A generated user response is converted to the local authentication protocol before being transmitted to the roamed system. The challenge and user response is then forwarded from the roamed system to the home system, where a similar conversion is performed before authenticating the subscriber based on the user response and an expected response.

U.S. Pat. No. 5,991,407 describes an authentication procedure in a GSM-based mobile communications system using an A3 algorithm for calculating a signed response from a challenge and an authentication key in a mobile unit. A CAVE (Cellular Authentication and Voice Encryption) algorithm is employed as the A3 algorithm. Parameter adaptation functions are provided between the input of the CAVE algorithm and the challenge and authentication key input, as well as between the output of the CAVE algorithm and the signed response output.

U.S. Pat. No. 6,389,536 B1 discloses a device verifying qualifications for using software distributed from a content provider to a user-appliance. In order to be able to execute the obtained software, the user-appliance is first authenticated by means of three including instruments of the verification device. A proof support information issuance instrument arranged at the content provider issues proof support information, e.g. in the form of a ticket sent to a proving instrument in the user-appliance upon a software execution request. The proving instrument generates response information based on the proof support information together with a challenge obtained from a verification instrument embedded in the software. This response information is transmitted to the verification instrument and is used for authentication purposes. If correctly authenticated, the verification instrument allows the user-appliance to execute the software.

The above-identified patents are impaired with the same or similar problems as the prior art challenge-response procedure previously discussed with reference to FIG. 2.

SUMMARY OF THE INVENTION

The present invention overcomes these and other drawbacks of the prior art arrangements.

It is a general object of the present invention to provide an improved challenge-response authentication procedure. In particular, it is desirable to provide an authentication procedure that enables an intermediate party to present valid evidence that a user has actually been authenticated. This would effectively prevent dishonest service providers from falsely claiming that users have accepted and made use of their services, and also prevent non-repudiation of the authentication from users. It may also be important to prevent and/or disarm interception attacks.

It is an object of the invention to provide an improved method and system for authenticating a user at an intermediate party based on a secret-key (symmetric cryptography) challenge-response procedure.

It is also an object of the invention to provide an improved authentication center for assisting in authentication of an associated user at an intermediate party.

Yet another object of the invention is to provide an improved service provider network node for authenticating a user associated with an authentication center.

These and other objects are met by the invention as defined by the accompanying patent claims.

In order to improve the basic secret-key (symmetric cryptography) challenge-response authentication procedure, a basic idea is to mask the expected response generated by the authentication center by means of a masking function, and transmit the masked expected response, instead of the expected response itself, to an intermediate party at which the actual authentication takes place. The intermediate party receives a user response from the corresponding user and also generates a masked user response using the same masking function as the authentication center. In order to authenticate the user, the intermediate party then verifies that the masked user response corresponds to the masked expected response received from the authentication center.

The above challenge-response procedure enables the intermediate party to prove that the user has been properly authenticated, and at the same time also prevents and/or disarms interception attacks due to the masking of the expected response.

The idea behind the proposed solution is that an attacker, such as an unauthorized user intercepting authentication parameters or a dishonest intermediate party, should not know the response beforehand. It is only the legitimate user and the authentication center that initially know the response and expected response, respectively. Accordingly, the idea is to prevent both interception attackers as well as the intermediate party from gaining access to the expected response, but still allow the intermediate party to authenticate the user based on the user response subsequently transmitted from the user. As explained above, this may be accomplished by masking the expected response at the authentication center before transmitting it to the intermediate party, and generating a corresponding masked user response at the intermediate party to enable authentication. With this procedure, the intermediate party can now use the response received from the user and corresponding user identification information, preferably together with the associated challenge used for generating the response, to prove that this particular user has actually been authenticated. Hence, intermediate parties, e.g. service providers, may be challenged to provide response values or response-challenge pairs to prove that users have actually been present in the network and/or utilized other services, before payments are transferred.

As previously mentioned, an attacker intercepting the authentication parameters between the authentication center and the intermediate party can obviously not use these parameters directly to masquerade as the legitimate user.

The proof of user authentication can be managed in an off-line or on-line procedure. In the former case, authentication proof information including at least the user response received from the user and preferably also the corresponding challenge is stored in a storage location from which it can later be retrieved by the intermediate party and presented as evidence of user authentication. In the latter case, the authentication proof information is forwarded more or less directly from the intermediate party to the authentication center, thus enabling on-line proof. Based on the presented authentication proof information, the authentication center may then perform relevant calculation(s) and/or comparison(s) to verify whether the intermediate party has actually authenticated a given user.

The masking function may be a private function known only to the authentication center and the intermediate party or a publicly known function, and generally has one-way and/or hash properties. For increased security, especially to defeat pre-computation attacks, the calculation of the masked expected response and the calculation of the masked user response may be performed based on a common masking random challenge, denoted SALT. The masking random challenge SALT may be completely random, independent of the random challenge, denoted RAND, used for generating the user response/expected response, and hence transmitted along with the RAND to the intermediate party.

However, in order to avoid additional signaling between the involved entities, the masking random challenge SALT can be derived from the random challenge RAND. In this case, the random challenge RAND is transmitted to the intermediate party and forwarded to the user, as usual. The masking random challenge SALT may then be calculated from the transmitted RAND at the intermediate party and subsequently used for generating the masked user response. An effective approach in this regard is to simply reuse the random challenge RAND as the masking random challenge SALT.

To allow smooth migration in relation to existing infrastructures, it is recommended that the intermediate party is notified whether or not the masking function has been employed when calculating the distributed expected response. Thus, the protocol for distributing authentication parameters is preferably extended with such an indication.

An additional threat is that a dishonest intermediate party could send the proof information to another party, which in turn presents the proof information to the authentication center in a request for payment (presumably for more expensive services). In addition, it could also be possible for an attacker to read the proof information from a hacked service provider node, and use the information to request payment of services. This particular problem may be solved by associating authentication data, generated by the authentication center for a given user, to the intermediate party that participates in the user authentication in order to bind corresponding proof information to the intermediate party. Preferably, the authentication data is interrelated, at the authentication center, to an identification of the intermediate party, and the authentication data is subsequently compared, at the authentication center, to received proof information (or a representation thereof) for verifying that the proof information is associated with the intermediate party.

The invention has turned out to be particularly useful in mobile communication systems, such as GSM or UMTS networks, but is not limited thereto.

The invention, which in all is a truly elegant solution, offers the following advantages:
- Allowing intermediate parties, such as service providers, to prove that users have actually been authenticated;
- Preventing dishonest service providers from falsely claiming that users have accepted their services;
- Preventing non-repudiation of user authentication by users;
- Effectively disarming interception attacks, since the masking function(s) makes it virtually impossible to steal the real authentication data;
- Possibility of binding proof information to a given intermediate party; and
- Providing easy migration with existing infrastructure.

Other advantages offered by the present invention will be appreciated upon reading of the below description of the embodiments of the invention.

BRIEF DESCRIPTION OF THE DRAWINGS

The invention, together with further objects and advantages thereof, will be best understood by reference to the following description taken together with the accompanying drawings, in which:

FIG. 5A is a flow diagram illustrating the expected response generation and masking step of FIG. 3 in more detail;

FIG. 5B is a flow diagram illustrating the masked expected response transmission step of FIG. 3 in more detail;

FIG. 5C is a flow diagram illustrating the user response generation and transmission step of FIG. 3 in more detail;

FIG. 5D is a flow diagram illustrating the masked user response generation step of FIG. 3 in more detail;

FIG. 5E is a flow diagram illustrating the verification step of FIG. 3 in more detail;

DETAILED DESCRIPTION OF EMBODIMENTS OF THE INVENTION

Figure 1:
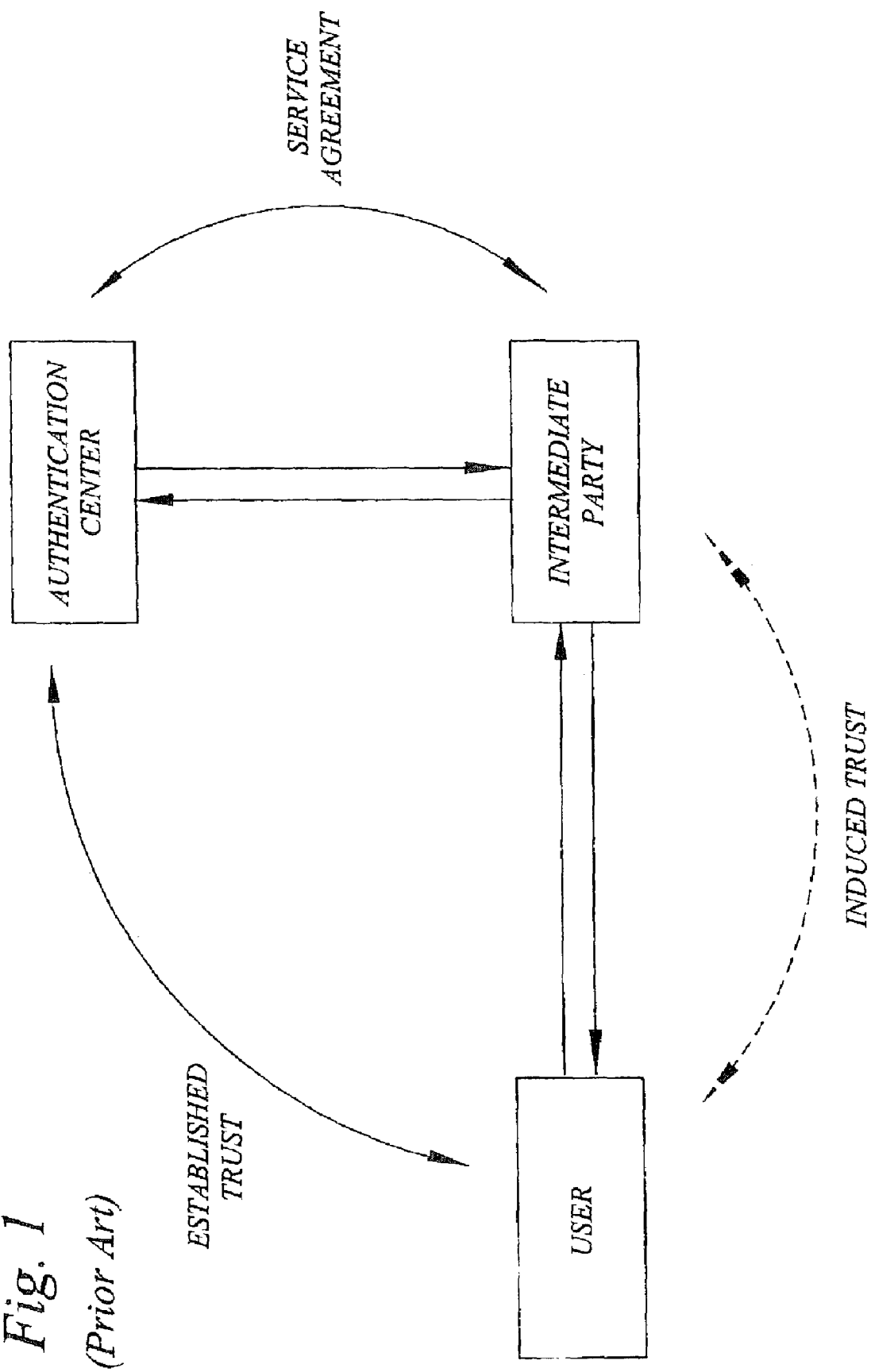
FIG. 1 is an overview of a communications system illustrating the relevant parties of an authentication procedure and their mutual relationships.
Figure 2:
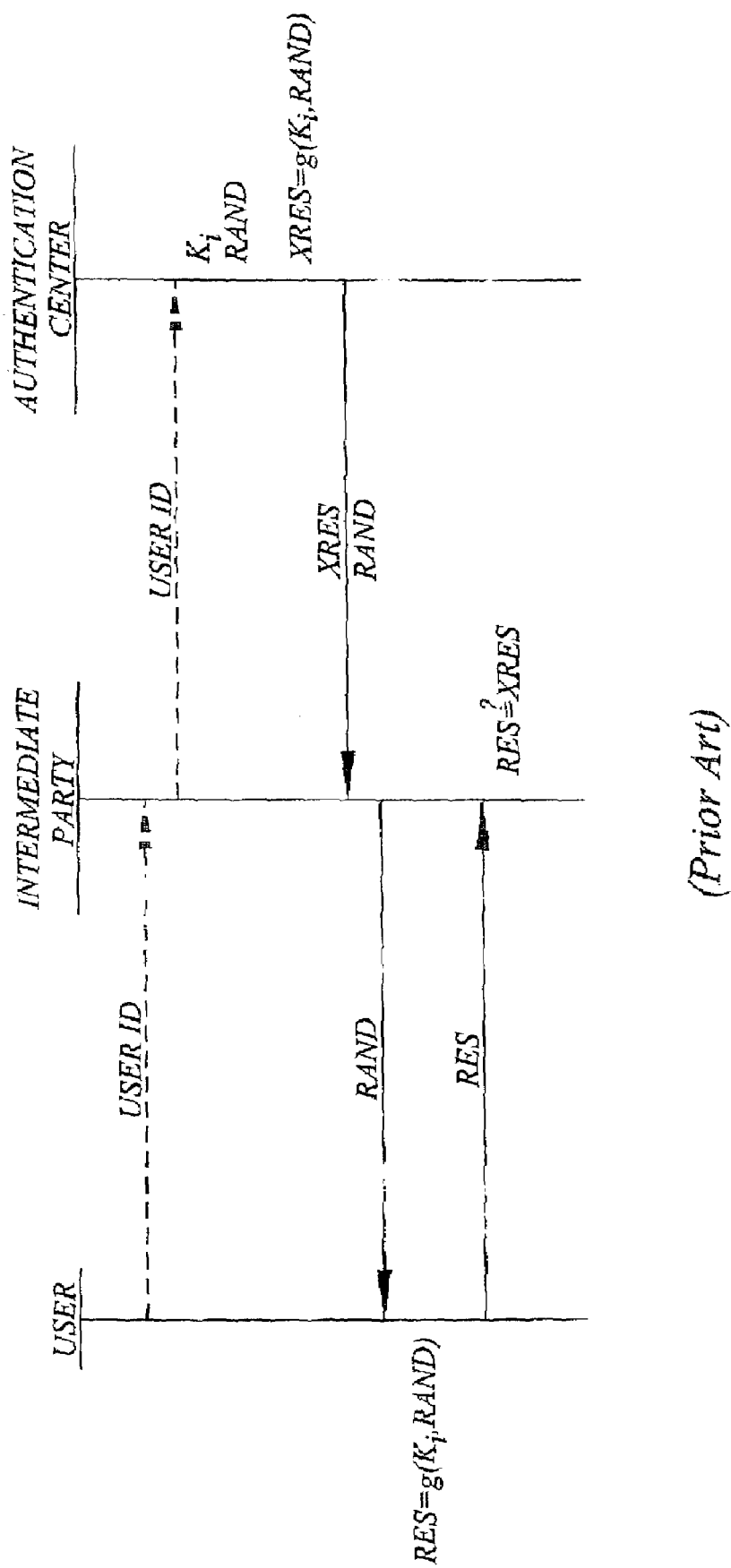
FIG. 2 is a schematic diagram of a typical prior art challenge-response authentication procedure illustrating transmission of information between the relevant parties.

Throughout the drawings, the same reference characters will be used for corresponding or similar elements.

Figure 3:
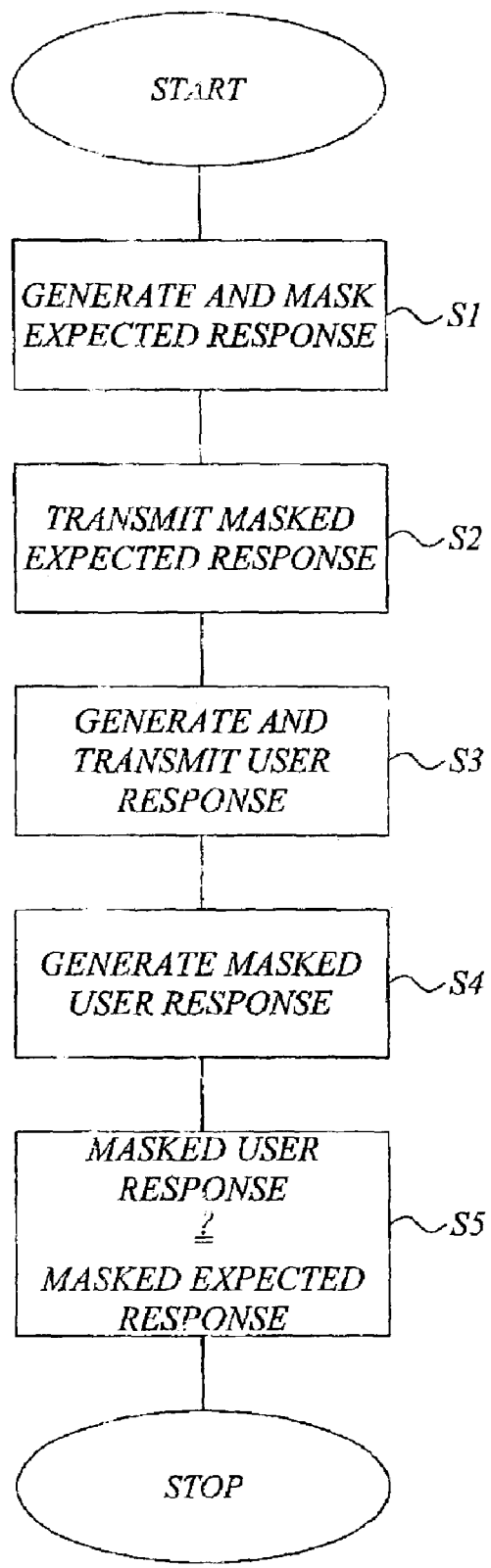
FIG. 3 is a flow diagram of a general challenge-response authentication procedure according to the invention.

In order to gain a basic and intuitive understanding of the invention, we will begin by describing a general challenge-response authentication procedure with reference to FIG. 3. It is here assumed that the involved parties include a user, an authentication center to which the user is associated, and an intermediate party that wants to authenticate the user. In this example, it is furthermore assumed that the overall authentication is based on a challenge-response procedure in which the authentication center generates an expected response and the user subsequently generates a corresponding response. A basic idea to introduce a masking function, which masks the generated expected response (S1). The masked expected response is then transmitted to the intermediate party (S2). The user generates and transmits a corresponding user response in a conventional manner (S3). The intermediate party thus receives a masked expected response from the authentication center, as well as the usual user response from the user. The intermediate party then generates a masked user response by means of the same masking function (S4) and finally compares the masked expected response and the masked user response in order to verify the user authentication (S5). In this way, the intermediate party is capable of proving that the user has been authenticated, keeping in mind that it is only the legitimate user/authentication center that initially knows the response/expected response. A dishonest service provider or an unauthorized user can not know the response beforehand. Accordingly, by masking the expected response at the authentication center before transmitting it to the intermediate party, the intermediate party as well as interception attackers are prevented from gaining access to the unmasked expected response. The generation of a corresponding masked user response, however, still allows the intermediate party to authenticate the user. This means that the intermediate party can use the response received from the user, preferably together with the associated challenge used for generating the response, to prove that this particular user has actually been authenticated. Hence, intermediate parties, e.g. service providers, may be challenged to provide response values, or preferably response-challenge pairs to prove that users have actually been present in the network and/or utilized other services, before payments are transferred.

Apparently, the authentication center and the intermediate party have a relation, which implies that the masking function has been exchanged between the authentication center and the intermediate party. This also holds true for similar information and/or functions that have to be common for the two parties.

It should be understood that the term "authentication center" is a generic term, not limited to the Authentication Center (AuC) node commonly found in modem mobile communication systems. The authentication center according to the invention may in fact be any center that manages or otherwise participates in authenticating a user in the manner described herein. For example, the authentication center may naturally be a home operator authentication center, possibly involving an AAA (Authorization, Authentication and Accounting) server that may or may not be co-located with the authentication center. However, it may also be a broker acting as a general authentication center, or identity center, for a number of different network operators or service providers.

The intermediate party may be any intermediate party at which the user is authenticated according to the present invention, including a network node managing a "visited" network into which the user is roaming, a web service provider, a content provider and, in fact, even the home operator's own MSC/VLR (Mobile Switching Center/Visited Location Register).

In the case of a visited network into which a user is roaming, the operator of the visited network may also offer other services, such as web services or even digital content, in addition to the basic network access services. However, if the web service provider and/or content provider are separate from the visited network operator, the situation becomes somewhat more complex. The visited network operator may of course have some relation to the other service providers, which may ask the operator for confirmation that a given user has already been authenticated by the operator. Alternatively, however, the challenge-response authentication procedure proposed by the invention is repeated for each independent intermediate party, such as a network access provider, web service provider and content provider. In the latter case, each service provider will then obtain its own authentication proof information.

The home operator's own MSC/VLR may also act as an intermediate party interacting with the authentication center, such as the home operator authentication center or a general identity center, in the authentication of users that want to access the network. If the MSC/VLR and the authentication center are managed by the same home operator, it is generally not necessary for the MSC/VLR to store authentication proof information. Instead, the main purpose of the masking is to protect the expected response transmitted between the authentication center and the MSC/VLR node against interception attacks. On the other hand, if the authentication center is a general identity center acting as an authentication center broker for the user's home operator, it is indeed interesting for the home operator's MSC/VLR to store user authentication proof information, which can later be used to prove that a given user actually has been authenticated at the MSC/VLR. It may also be convenient to have a standardized authentication procedure, which is the same regardless of whether the intermediate party is managed by the home operator or an external party.

In the case of services other than basic network access services, the required signaling generally takes place on the application level of the protocol stack. In this case, it is typically an application in the user terminal that initiates the authentication (and key agreement) procedure. General information on mechanisms for enabling applications in the terminal to initiate AKA can be found in H. Haverinen, "EAP SIM Authentication", Internet Draft of the Internet Engineering Task Force.

As mentioned, the intermediate party could also be a web service provider, or a content provider distributing digital media data such as audio, video, images, electronic books and software to a user. In the case of content provider, the authentication according to the invention is preferably performed before the actual downloading or streaming of media to the user.

Actually, any party providing services such as network access services, web services, content services or payment broker services may act as an intermediate party as used in the present description.

Figure 4:
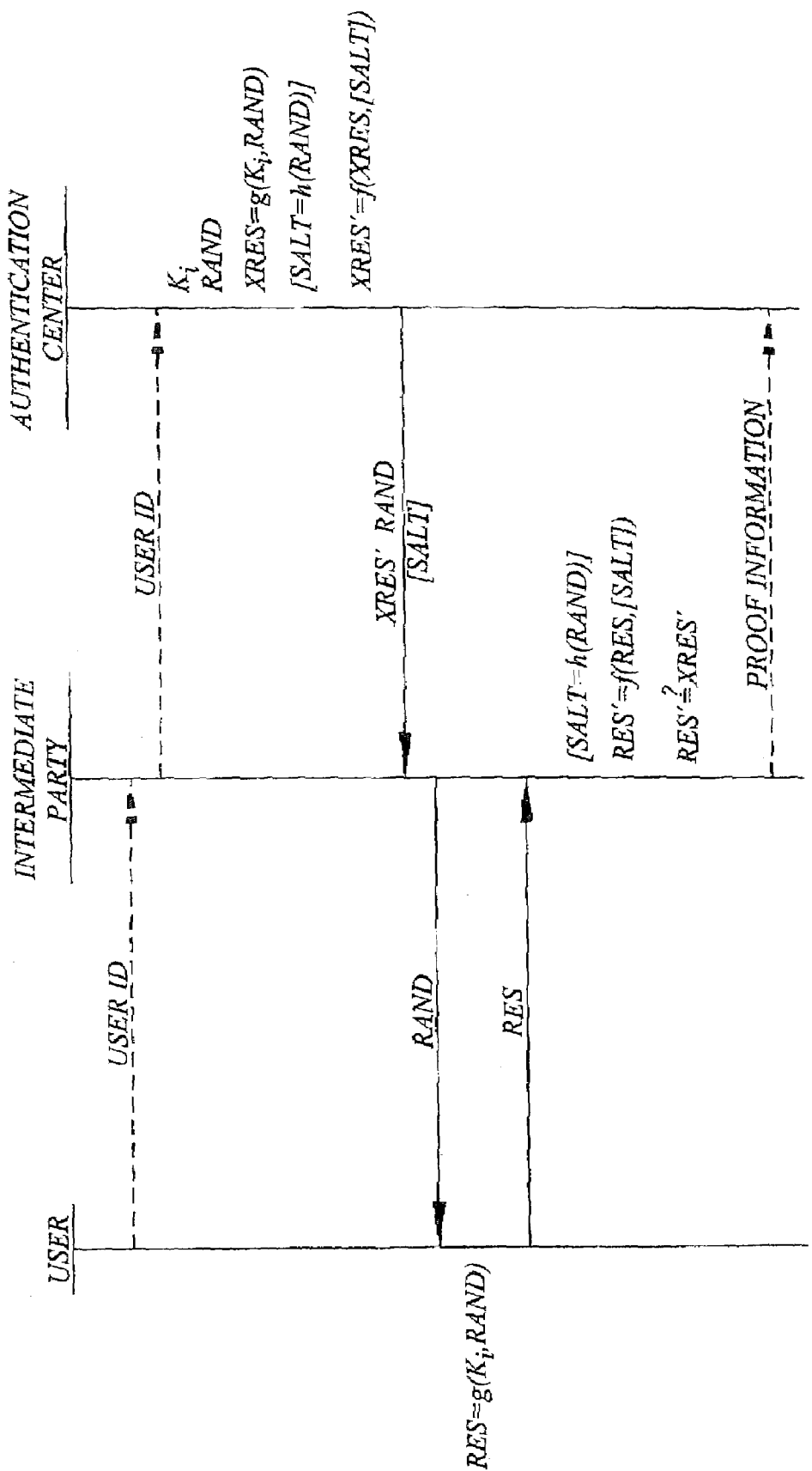
FIG. 4 is a schematic diagram of an example of a challenge-response authentication procedure according to the invention illustrating transmission of information between the relevant parties.

For a better understanding of the invention, a more complete example of an authentication procedure according to the present invention will now be described with reference to FIG. 4, illustrating transmission of authentication information between the relevant parties, as well as the flow diagrams of FIGS. 5A–E.

In general, the overall authentication is initiated by a user transmitting a user ID to an intermediate party, which in turn forwards the user ID to an associated authentication center in request for authentication data. Based on the received user ID, the authentication center identifies a symmetric/shared secret key $K_i$ associated with the particular user. For example, the key $K_i$ could be a subscription key, if the user has a subscription with a home operator, or a cryptographic key associated with a pre-paid account. The authentication center generates a random challenge RAND (S11) and calculates an expected response XRES (S12) based on the secret key $K_i$ and the random challenge RAND as input to a given function g. The authentication center then preferably generates a masking random challenge SALT (S13), for example as a completely independent random value or based on the random challenge RAND, and uses this masking random challenge SALT and the calculated expected response XRES as input to a masking function $f$ to calculate a masked expected response XRES' (S14). Subsequently, the masked expected response XRES' and the random challenge RAND are transmitted (S21), possibly together with the optional masking random SALT (S22), to the intermediate party.

For an intermediate party that is completely external to or independent of the authentication center, it is normally also required that the intermediate party receives information from the user that can be used to determine the identity of the authentication center to which the user is associated, and more particularly the identity of the user's home operator. This enables the intermediate party to send the request for authentication data to the relevant authentication center/home operator, keeping in mind that the authentication center may be the authentication center of a particular home operator or a broker acting as a general authentication center or identity center. In the latter case, the home operator identity is normally required to find the relevant secret key information, as will be explained later on with reference to FIG. 11.

Once received, the intermediate party forwards the random challenge RAND to the user (S31). The user then calculates a user response RES (S32) with the random challenge RAND and the user's copy of the shared secret key $K_i$ as input to the same function g as the authentication center used for calculating the expected response XRES. The obtained user response RES is transmitted to the intermediate party (S33) for use in the subsequent authentication.

If the optional masking random challenge SALT was not explicitly transmitted from the authentication center, the intermediate party may derive it (S41) prior to verification of authentication, preferably based on the random challenge RAND. A masked user response RES' is calculated by the intermediate party (S42) by means of the user response RES and the optional, received or derived, masking random challenge SALT as input to the masking function $f$. Thereafter, the intermediate party compares (S51) the calculated masked user response RES' with the masked expected response XRES' obtained from the authentication center. If the masked user response RES' corresponds to the masked expected response XRES', the intermediate party has authenticated the user (S52).

As was briefly mentioned in the foregoing, the masking random challenge SALT is optional and may be omitted from the authentication procedure. In such a case, no random challenge SALT is input to the masking function $f$ for calculating the masked expected response XRES' and masked user response RES', respectively. However, in order to increase the security, and particularly to defeat pre-computation attacks, the masking random challenge SALT is preferably included as masking function input. Thus, the masking random challenge SALT could be generated as a completely random value at the authentication center and subsequently transmitted to the intermediate party together with the masked expected response XRES' and random challenge RAND. However, in order to avoid additional signaling between the authentication center and the intermediate party, the masking random challenge SALT could alternatively be derived from the random challenge RAND. In this case, the authentication center preferably generates the masking random challenge SALT by some function h of the random challenge RAND. Hence, no masking random challenge SALT needs to be transmitted to the intermediate party, which instead may use the same function h to generate the masking random challenge SALT from the random challenge RAND. An example of a usable masked random challenge SALT is simply to reuse the random challenge RAND as masked random challenge SALT, with h hence being represented as a unity function.

The function h may be a public function or a function associated and distributed with the business agreement between the intermediate party and the legal party (such as a home operator) of the authentication center, various aspects of which will be discussed in detail later on.

The masking function $f$ used on one hand by the authentication center for generating the masked expected response and on the other by the intermediate party to calculate the masked user response could be a one-way function and/or a hash function. Preferably, the masking function is a cryptographic hash function having one-way functionality and properties that make it infeasible to find two distinct inputs which hash to a common value.

For further information on one-way functions and hash functions, reference is made to A. J. Menezes, P. C. van Oorschot and S. C. Vanstone, "Handbook of Applied Cryptography", CRC Press, chapter 1, pp. 1–48.

The masking function $f$ may be a public function, or a private function known by the authentication center and the intermediate party. In the latter case, the private masking function could be associated with a business agreement between the legal party, such as a given home operator, of the authentication center and the intermediate party such as a service provider. If the legal party of the authentication center, for example a home operator, has such business agreement with several different service providers, a corresponding private function may be used by the home operator for each service provider, i.e. each operator-provider agreement is manifested in a private masking function. However, alternatively, one and the same public masking function could be used for all service providers.

If the masking function is known, it is at least theoretically possible to search for a user response which makes the masking function evaluate into the masked expected response received from the authentication center. A dishonest intermediate party, such as a service provider, may then deploy such an attack to "prove" that a user has been authenticated even if no user authentication has been performed. This is simply solved by a careful choice of the properties of the authentication parameters. For example, by choosing the user response to be n bits and the masked expected response to be m bits, n>m, the average number of user responses to be tested before finding the one that is associated with a present masked expected response is approximately $2^{m-1}$. In addition, the probability that this would be the correct user response is only $2^{-(n-m)}$. For a UMTS mobile communications system, standardized parameter sizes allow n to be 96 and m to be 80, which gives the infeasible task of testing $2^{79}$ different user responses and a probability of correct user response of only $2^{-16}$.

It is also possible to mask the user response/expected response differently depending on e.g. the actual service obtained from the intermediate party. This means that for some services a certain kind of masking, e.g. a first masking function, is used, whereas for other services another masking, a second masking function, is employed. In such a case, some form of information is preferably included in the transmission between the authentication center and the intermediate party to notify which masking function that should be used in the particular user authentication.

In order to allow smooth migration in relation to existing infrastructure, the intermediate party is preferably notified whether or not the masking function has been employed when calculating the distributed expected response. Thus, the protocol for distributing authentication parameters is preferably extended with such an indication. Similarly, an indication of which masking function to use may be included in the protocol if a choice between different masking functions is present, as was discussed above.

The intermediate party can use the response received from the user and some user identification information such as a user ID, preferably together with the random challenge used to generate the response, as proof information to prove that this particular user actually has been authenticated. Thus, the intermediate party conveniently stores the received user response, the user ID, and the random challenge at a suitable location for later retrieval, if necessary, as evidence of the user authentication. In this off-line procedure for proof of user authentication, the user response and user ID, preferably together with the corresponding random challenge, could be stored at the intermediate party at some other accessible location.

When challenged by the authentication center, or some other related party, to provide proof of the authentication of a given user, the intermediate party can transmit the proof information, such as the user response RES, the corresponding random challenge RAND and the user ID, to the authentication center. Preferably, the authentication center then retrieves the secret key $K_i$ associated with the given user and calculates the expected response value XRES based on the received RAND and the secret key $K_i$, and finally compares the received RES value with the calculated XRES value to verify whether the user has actually been authenticated at the intermediate party. If the RES value matches the XRES value, the proof information is considered valid.

| Intermediate party: | RAND, RES, user ID |
|---|---|
| Authentication center: | user ID $\Rightarrow K_i$ |
| | $g(K_i, RAND) \Rightarrow XRES$ |
| | check: XRES $\stackrel{?}{=}$ RES |

Alternatively, the intermediate party simply transmits the RES value and the user ID of a given user to the intermediate party. In this case, the authentication center typically needs to store XRES values, or RAND values so that the corresponding XRES values can be calculated, for the users so that a comparison between RES and XRES can be performed.

If an on-line procedure is desired, the user response and user ID, preferably together with the corresponding random challenge, are forwarded more or less directly from the intermediate party to the authentication center, thus enabling proof of authentication.

Associating Authentication Proof Information to a Specific Intermediate Party

An additional threat is that a dishonest intermediate party could send the proof information to another party, which in turn presents the proof information to the authentication center in a request for payment (for example assuming that the services of the other party are more expensive than those of the intermediate party). In addition, it could also be possible for an attacker to read the proof information, including for example the user ID, the user response RES and the corresponding random challenge RAND, from a hacked node of the intermediate party. This attacker could then present the received proof information to the authentication center, falsely claiming that the user has accessed some service, and request payment. If considered necessary or otherwise important, this particular problem may be solved by associating authentication data, generated at the authentication center for a given user, to the intermediate party that participates in the user authentication in order to bind corresponding proof information to the intermediate party.

In the initial steps of the overall authentication procedure of the invention, the intermediate party forwards a user ID together with a request for authentication data to the authentication center. In general, the user ID is accompanied by information identifying the intermediate party that requests authentication data. In order to allow later binding of authentication proof information to a specific intermediate party, the authentication center may store the user ID and generated authentication data such as RAND, SALT and/or XRES with a reference to which intermediate party that the authentication data is sent to. By interrelating, at the authentication center, at least part of the authentication data generated for a given user to an identification of the intermediate party that requested authentication data, the corresponding proof information can not be used by any other party.

When the intermediate party is challenged to provide proof information before the authentication center it also transmits its own identity, also referred to as a service provider identity, denoted $ID_{SP}$, to the authentication center. On receiving proof information, the authentication center compares the user response RES obtained from the intermediate party with a stored or re-generated expected response XRES to verify that a user has been authenticated. However, the authentication center may now also compare received proof information with stored authentication data, having a reference to the intermediate party to which the authentication data was transmitted, in order to verify whether the proof information is really associated with the intermediate party that presents the proof information.

Another possible solution for binding proof information to an intermediate party is to associate the generation of the masking random challenge SALT at the authentication center with the intermediate party $ID_{SP}$. The authentication center may have a set of different functions h used for generating SALT from RAND, and preferably assigns, to each intermediate party, a unique function $h_{SP}$. This function $h_{SP}$ is used by the authentication center for generating the masking random challenge SALT from RAND, and the generated SALT is transmitted to the intermediate party. Unless SALT values are stored with a reference to the corresponding $ID_{SP}$ in the authentication center, the functions $h_{SP}$ are preferably kept secret by the authentication center. When presenting proof information, including RES, RAND and user ID to the authentication center, the intermediate party is required also to transmit its associated $ID_{SP}$ and the previously received masking random challenge SALT. Based on the received $ID_{SP}$, the authentication center identifies the relevant function $h_{SP}$ and calculates an expected masking random challenge XSALT based on the received random challenge RAND. In order to verify that the proof information originates from the correct intermediate party, XSALT is compared to the received SALT from the intermediate party. A match therebetween is a verification of correct origin of the proof information. Keeping the unique intermediate-party-specific function secret makes it impossible for another party to use the proof information.

| Intermediate party: | RAND, SALT, RES, user ID, $ID_{SP}$ |
| --- | --- |
| Authentication center: | user ID $\Rightarrow K_i$ |
| | $g(K_i, RAND) \Rightarrow XRES$ |
| | $ID_{SP} \Rightarrow h_{SP}$ |
| | $h_{SP}(RAND) \Rightarrow XSALT$ |
| | checks: XRES $\stackrel{?}{=}$ RES |
| | XSALT $\stackrel{?}{=}$ SALT |

Instead of using a unique function $h_{SP}$ for each intermediate party in generation of the masking random challenge SALT, a common function h could be used by the authentication center for several or all intermediate parties. However, the function h has both the random challenge RAND and the intermediate party $ID_{SP}$ as input. Thus, the authentication center calculates SALT based also on $ID_{SP}$ received together with the user ID in the initial steps of the authentication procedure. In the same manner as described above, the intermediate party is requested to include $ID_{SP}$ and the received copy of SALT in the proof information. Once received, the authentication center calculates an expected masking random challenge XSALT based on the received $ID_{SP}$ and RAND and the function h. XSALT is then compared with SALT transmitted from the intermediate party, and a match therebetween verifies correct origin of the proof information. Keeping the common function h secret makes it impossible for another party to present valid proof information, based only on RES and RAND.

| Intermediate party: | RAND, SALT, RES, user ID, $ID_{SP}$ |
| --- | --- |
| Authentication center: | user ID $\Rightarrow K_i$ |
| | $g(K_i, RAND) \Rightarrow XRES$ |
| | $h(RAND, ID_{SP}) \Rightarrow XSALT$ |
| | checks: XRES $\stackrel{?}{=}$ RES |
| | XSALT $\stackrel{?}{=}$ SALT |

In yet another alternative embodiment, the generation of the random challenge RAND could be based on the intermediate party $ID_{SP}$. Upon request of user authentication, the authentication center generates a random prechallenge RAND' and calculates the challenge RAND by means of RAND' and the intermediate party $ID_{SP}$ as input to a function r:

$RAND = r(ID_{SP}, RAND')$.

This random challenge RAND is subsequently used for generating the expected response RES and is sent to the intermediate party together with the masked expected response XRES'. The authentication center stores RAND' with a reference to the associated user ID and intermediate party $ID_{SP}$. When verifying that a user has actually been authenticated by the intermediate party, the authentication center calculates an expected random challenge XRAND with $ID_{SP}$ and the stored RAND' as input to the function r. XRAND is then compared with RAND received from the intermediate party, and if they match, the authentication center can verify that the proof information is transmitted from the correct intermediate party. Also, verification of user authentication by means of RES and XRES is performed as in the foregoing. This solution is especially applicable when no masking random challenge SALT is employed in the user authentication procedure.

| Intermediate party: | RAND, RES, user ID, $ID_{SP}$ |
| --- | --- |
| Authentication center: | user ID $\Rightarrow K_i$ |
| | $g(K_i, RAND) \Rightarrow XRES$ |
| | $ID_{SP} \Rightarrow RAND'$ |
| | $r(RAND', ID_{SP}) \Rightarrow XRAND$ |
| | checks: XRES $\stackrel{?}{=}$ RES |
| | XRAND $\stackrel{?}{=}$ RAND |

The functions discussed above h, $h_{SP}$ and r preferably have one-way functionality, with properties making it infeasible to find two distinct inputs which hash to a common value.

In general, the XRES-RES comparison verifies whether a given user with a user ID has been authenticated, and the XSALT-SALT/XRAND-RAND comparison verifies whether the user has been authenticated by the intermediate party having identity $ID_{SP}$.

Optional Cryptographic Aspects

Although not illustrated in FIG. 4, additional information such as a confidentiality key, integrity key and authentication token can be generated at the authentication center and transmitted to the intermediate party. In such a case, this additional information, e.g. the confidentiality key and integrity key, could be modified by the response prior to use. For example, the authentication center can cryptographically protect the confidentiality key and integrity key based on the calculated expected response. The keys are then transmitted encrypted to the intermediate party, which makes any interception of the distributed keys useless for wiretapping arid decryption. The intermediate party then extracts the confidentiality key and integrity key from the encrypted information using the response received from the user.

In addition, other information than AKA derived keys may be cryptographically protected by means of the expected response before transmitted between the authentication center and the intermediate party.

In general, the transmission of authentication parameters, including the masked expected response, random challenge and masking random challenge, between the authentication center and the intermediate party may be cryptographically protected. In UMTS applications, for example, the MAPSec protocol may be used for parameter protection.

Implementational Aspects

The above-described steps, actions and algorithms may be implemented in software/hardware or any combination thereof. For hardware implementations, ASIC (Application Specific Integrated Circuit) technology or any other conventional circuit technology may be used. Although, special tamper-resistant hardware may be preferred for security reasons, properly protected software implementations are often more convenient.

Figure 6:
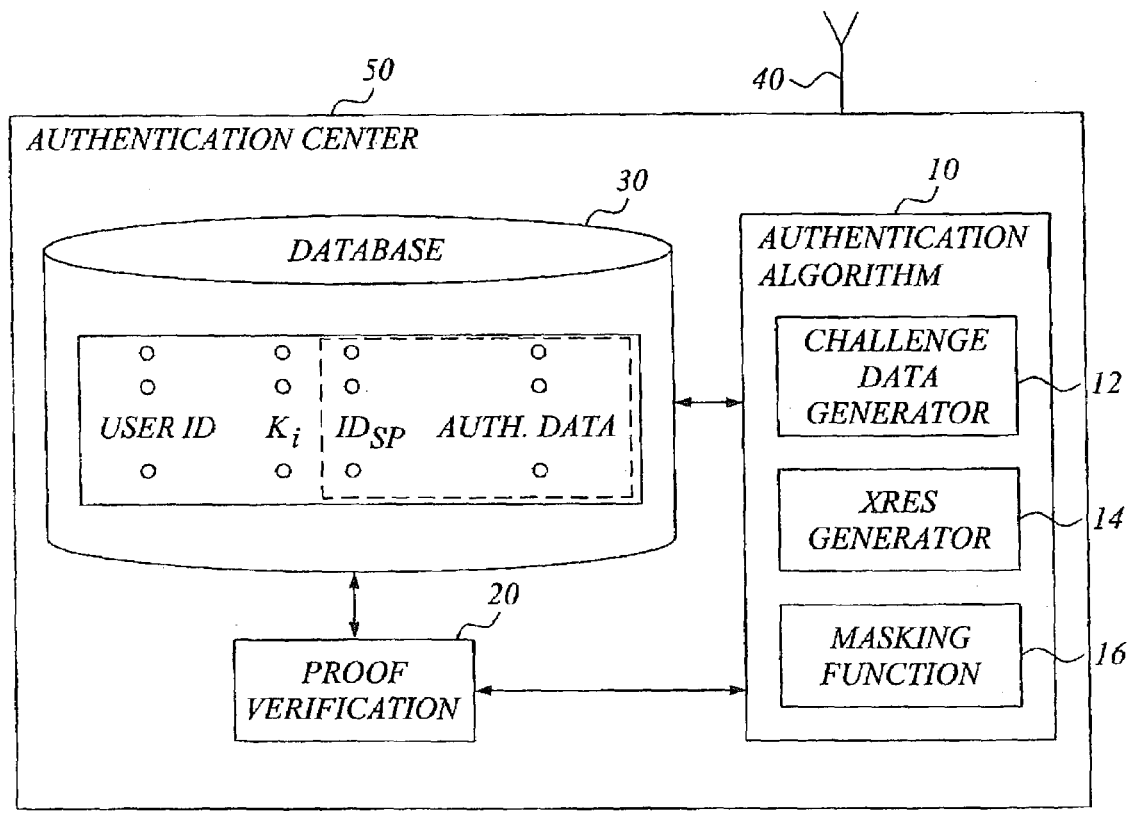
FIG. 6 is a schematic block diagram of an example of an authentication center according to a preferred embodiment of the invention.

FIG. 6 schematically illustrates an example of an authentication center according to a preferred embodiment of the invention. The authentication center 50 generally includes an authentication algorithm unit 10 for generating authentication data employed for authenticating a user, a proof verification unit 20 and a database 30. The authentication algorithm unit 10 comprises a challenge data generator 12, an XRES generator 14 and a masking function unit 16. As the name indicates, the challenge data generator 12 generates challenge data, including the random challenge and optionally also the masking random challenge. The XRES generator 14 generates the expected response XRES based on the challenge data and a secret user-associated key from the database 30. The masking function unit 16 generates the masked expected response based on the optional masking random challenge and the expected response from challenge data generator 12 and XRES generator 14, respectively. The proof verification unit 20 is preferably also implemented in the authentication center 50 for verifying proof information received from the intermediate party. This proof verification unit 20 preferably utilizes data stored in the database 30 for the proof verification. The database 30 may, in addition to user ID and associated secret key $K_i$ information, optionally include authentication data and/or such data stored with reference to intermediate party identification information $ID_{SP}$. The authentication center 50 also comprises a transmitter/receiver 40, with associated circuitry, for communication with the intermediate party and user.

Figure 7:
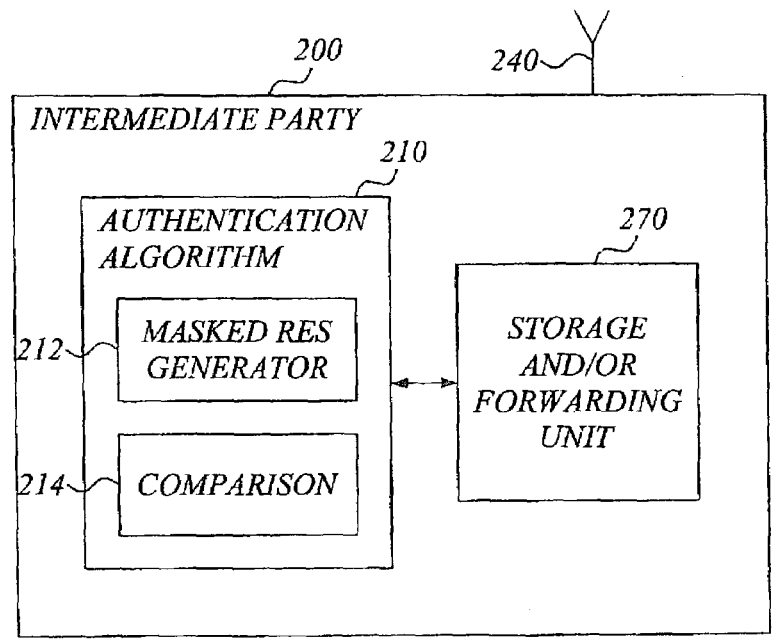
FIG. 7 is a schematic block diagram of an example of an intermediate party according to a preferred embodiment of the invention.

FIG. 7 schematically illustrates an example of an intermediate party according to a preferred embodiment of the invention. The intermediate party 200 includes an authentication algorithm unit 210 for authenticating a user. The authentication algorithm unit 210 comprises a masked response generator 212 and a comparison unit 214. The masked response generator 212 generates a masked user response based on a masking function and the user response received from the user. The comparison unit 214 is employed for comparing the masked user response from the generator 212 with the masked expected response transmitted from the authentication center. A storage and/or forwarding unit 270 is preferably also arranged in the intermediate party 200 for storing and/or forwarding proof information including the user response and user ID, and preferably also challenge data received from the authentication center or generated by the authentication algorithm unit 210. This proof information from the storage and/or forwarding unit 270 is transmitted to the authentication center, e.g. upon a request or as soon as the proof information is obtained by the intermediate party 200. The intermediate party 200 also comprises a transmitter/receiver 240, with associated circuitry, for communication with the authentication center and the user.

Exemplary Application—Mobile Communication System

Although the invention is generally applicable to any secret-key challenge-response system, the invention has turned out to be particularly useful in mobile communication systems. The invention will now be described with reference to a particular exemplary application and embodiment, namely a mobile communication system, in which the intermediate party is a network node managing a mobile/cellular network into which a mobile unit (user) is roaming. In this particular example, the authentication center is a home operator authentication center (AuC). The mobile unit is associated, for example through a subscription or a pre-paid account, with a home operator managing a home network system. This user-operator relation is typically manifested in a SIM card used in GSM mobile units or a UMTS SIM card (USIM) used in UMTS mobile units. It should though be understood that in a more general mobile communications application, the intermediate party may be any type of service provider including a visited network node, the home operator's own MSC/VLR node, a web service provider, a media content provider and a payment broker.

Figure 8:
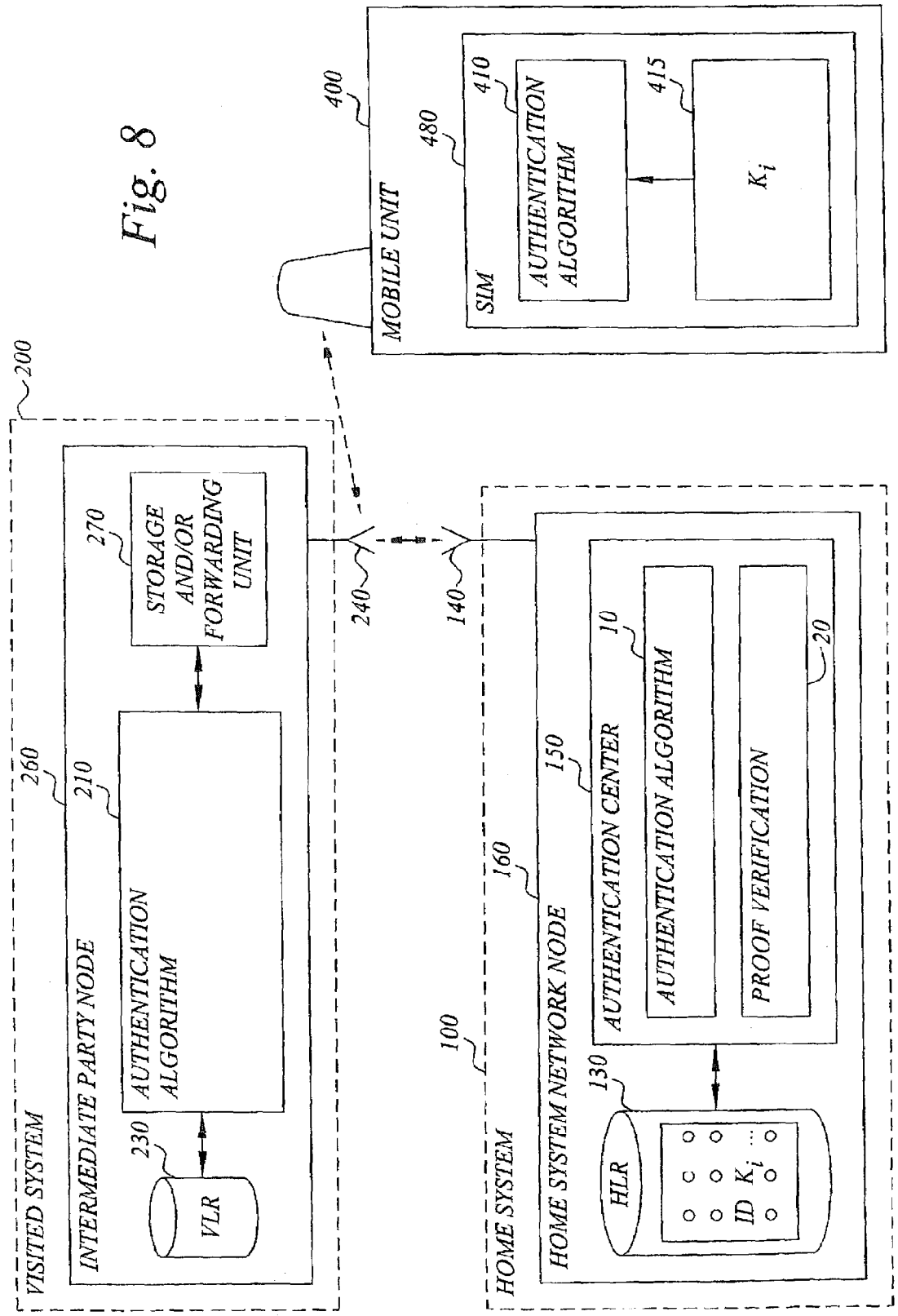
FIG. 8 is a schematic block diagram of an exemplary embodiment of an authentication system illustrated as a home network system with an associated mobile unit roaming in a visited network system.

FIG. 8 is a schematic block diagram of an exemplary embodiment of an authentication system illustrated as a home network system with an associated mobile unit roaming into a visited network system. The home system 100 generally comprises one or more network nodes 160, of which one is illustrated. For example, the network node 160 may be a MSC (Mobile Switching Center) or a base station (BS). In the example of FIG. 8, the network node 160 comprises a HLR (Home Location Register) 130. This HLR 130 includes information, e.g. user ID and corresponding secret subscription key $K_i$, of the users associated to the home system 100. The HLR 130 could optionally include authentication data and/or such data stored with reference to intermediate party identification. In addition, the network node 160 also comprises an authentication center (AuC) 150 managing and participating in authentication of users. The AuC 150 comprises an authentication algorithm unit 10 implementing an authentication algorithm, and a proof verification unit 20 for verification of proof information from the visited system 200. When executed, the authentication algorithm generates the relevant authentication data of the invention. The home network node 160 is further equipped with a transmitter/receiver 140, with associated circuitry, for transmitting the generated random challenge, masked expected response and possibly the masking random challenge to a network node 260 of a roamed or visited system 200.

The visited system 200 likewise comprises one or more network nodes 260, of which one is illustrated in FIG. 8. The network node 260 of the visited system 200 preferably comprises a VLR (Visited Location Register) 230 and an authentication algorithm 210. Furthermore, a transmitter/receiver 240 is arranged for receiving the authentication parameters from the home system 100 and forwarding the received random challenge to the roaming mobile unit 400, as well as transmitting proof information to the authentication center 150 of the home system The visited network node 260 preferably also comprises a storage and/or forwarding unit 270 for storing the user response received from the mobile unit 400 and possibly the random challenge from the home system 100. However, storage of the user response could, as an alternative or as a complement, be provided at another location that can be accessed by the operator of the visited system 200 for later retrieval of the information in a user authentication proof procedure. The data stored in this unit 260 is transmitted to the authentication center upon a request therefrom.

In the particular example of FIG. 8, the user is a roaming mobile unit 400 being authenticated by a network node 260 of the visited or roamed network system 200. As was mentioned above, the mobile unit 400 preferably comprises a SIM (USIM) 480 equipped with the secret key $K_i$ 415 and an authentication algorithm unit 410. This authentication algorithm implemented in unit 410 could for example be the A3 algorithm of the AKA protocol in GSM and UMTS. When executed, the authentication algorithm calculates a user response, preferably based on the random challenge forwarded from the visited system 200 and the secret key $K_i$ 415 of the STM 480. The mobile unit 400 then sends the user response to the visited system network node 260, where the final authentication is performed.

Figure 9:
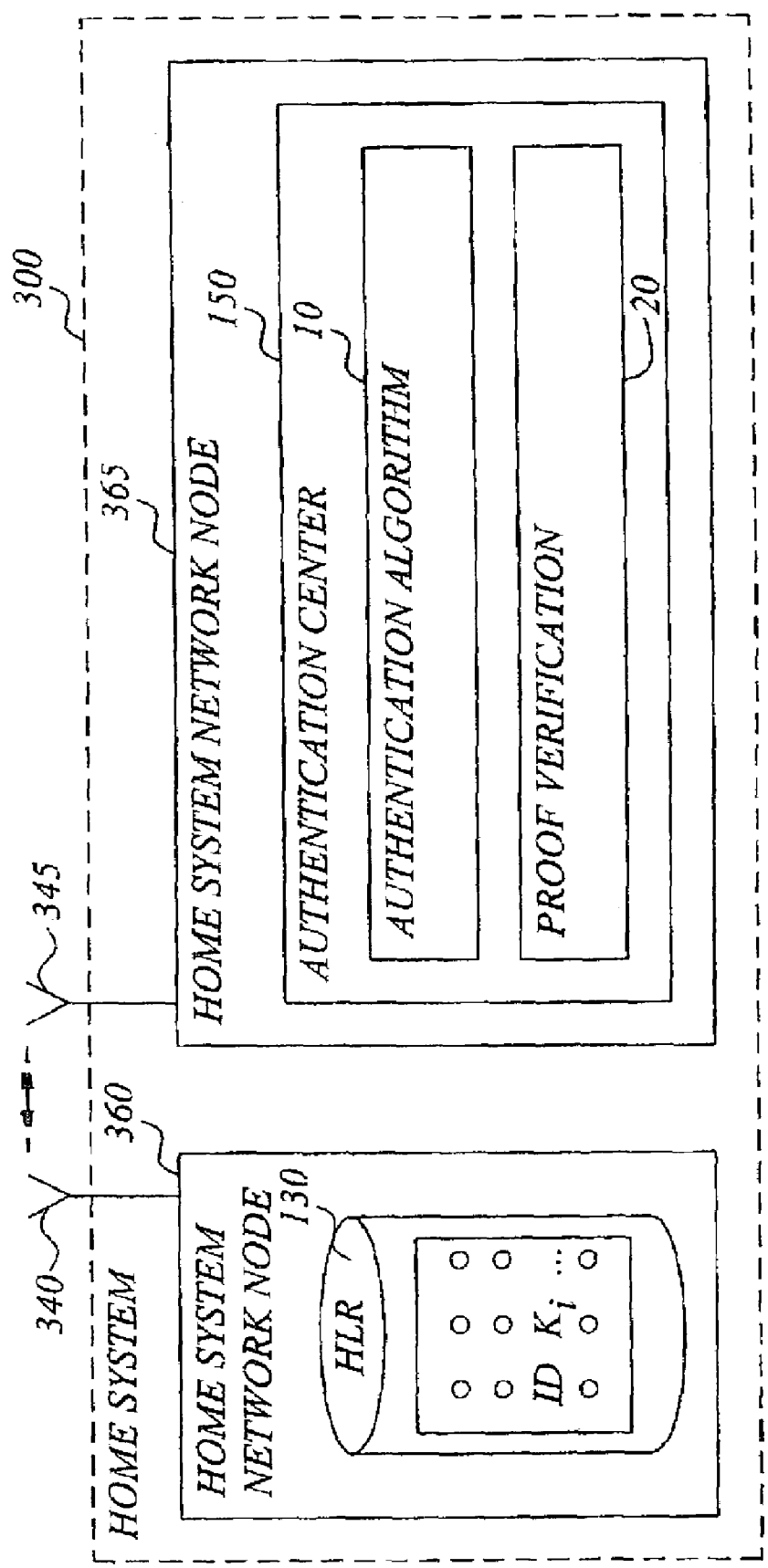
FIG. 9 is a schematic block diagram of another exemplary embodiment of a home network system according to the invention with the home authentication algorithm and HLR (Home Location Register) implemented in different network nodes.

FIG. 9 illustrates another exemplary embodiment of a home network system 300 including an AuC 150 according to the invention. In this embodiment, the home system 300 is illustrated with two network nodes 360, 365 each equipped with a respective transmitter/receiver 340, 345. A first node 360 comprises the HLR 130, whereas the AuC 150 with the authentication algorithm unit 10 and proof verification means 20 is arranged in a second node 365. The first node 360 may be an MSC with the second node 365 as a BS. Alternatively, both the first node 360 and the second node 365 may be MSC:s or BS:s, or the first node 360 may be a BS with the second node 365 as an MSC.

Figure 10:
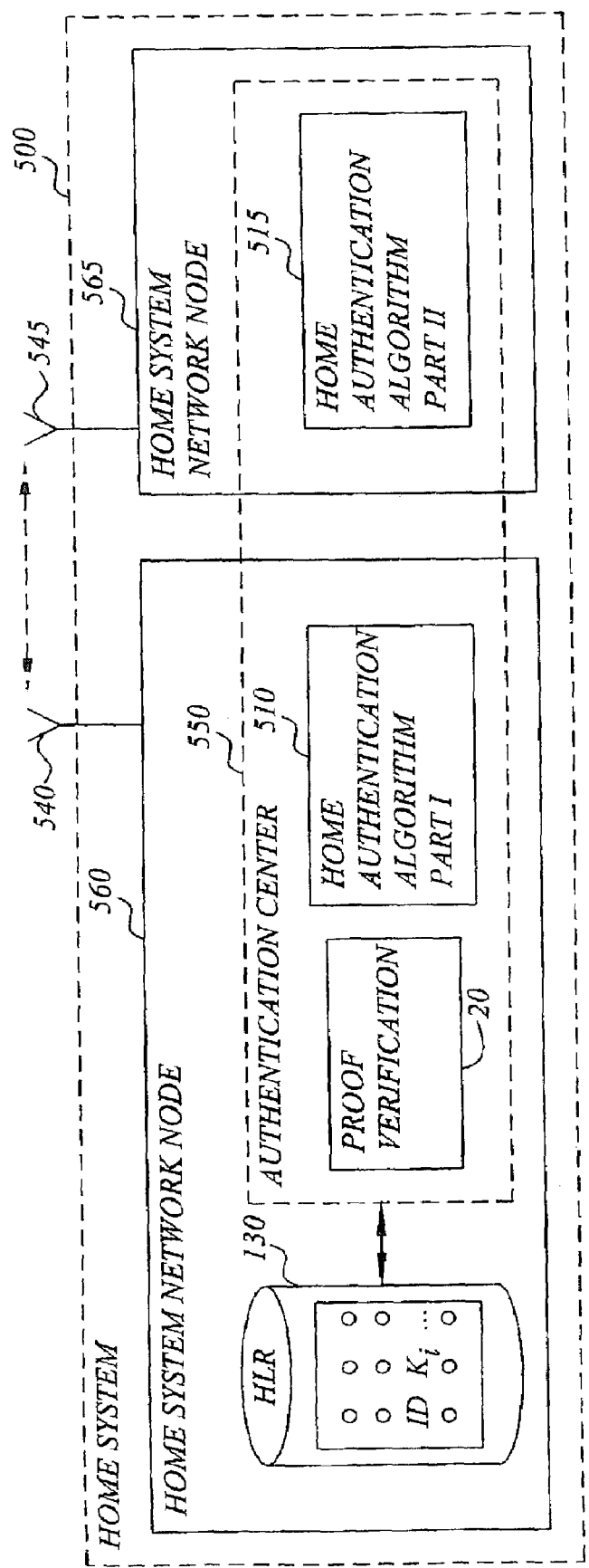
FIG. 10 is a schematic block diagram of yet another exemplary embodiment of a home network system according to the invention with the home authentication algorithm distributed between several network nodes.

FIG. 10 is a schematic block diagram of yet another exemplary embodiment of a home network system according to the invention with the home authentication algorithm distributed between several network nodes. Two network nodes 560, 565 each equipped with a respective transmitter/reciever 540, 545 are explicitly illustrated in FIG. 10. In this embodiment, the AuC 550 is distributed between the two nodes 560, 565. This means that part 510 of the overall authentication algorithm is implemented in the first node 560, whereas the remaining part 515 of the authentication algorithm is implemented in a second node 565, or several other nodes. The proof verification unit 20 of the AuC 550 is preferably implemented in the network node 560 that is housing the HLR 130, thereby having access to the data stored in the HLR 130.

The visited system may likewise have the VLR and authentication algorithm parted at different network nodes and/or the authentication algorithm distributed between different nodes.

For further detailed information on general authentication procedures in mobile communication systems, reference is made to J. Arkko, H. Haverinen, "EAP AKA Authentication", Internet Draft of the Internet Engineering Task Force, and the previously mentioned Internet Draft "EAP SIM Authentication" by H. Haverinen.

EXAMPLE-A Broker Acting as an Authentication Center

Figure 11:
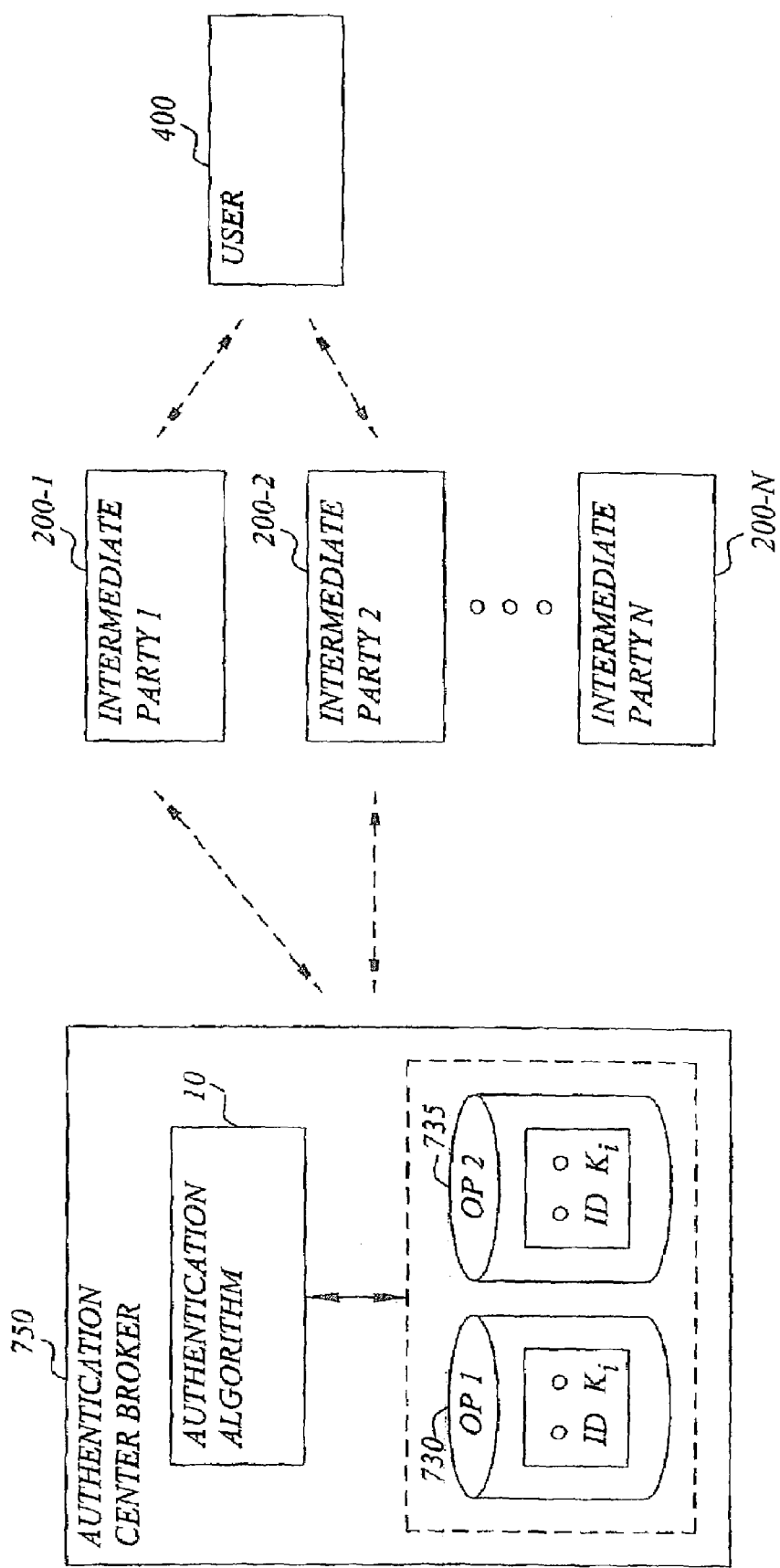
FIG. 11 is a schematic diagram illustrating a broker acting as an authentication center for a number of different network operators.

As previously indicated, the authentication center is not necessarily the authentication center of a particular home operator, but may be a broker 750 acting as a general authentication center, or identity center, for a number of different network operators, as schematically illustrated in FIG. 11. In this case, the authentication center, or identity center, broker 750 is generally trusted with user identification information and secret key information 730, 735 from the different network operators, thus making it possible for the broker 750 to utilize the authentication algorithm 10 to assist in the authentication of users at various intermediate parties 200-1 to 200-N.

Generally, when a user 400 wants to authenticate himself/herself before a given intermediate party 200, the user sends its user ID and, if required, some information representing the home operator's identity $ID_{OP}$ to the intermediate party. The intermediate party then forwards the user ID and $ID_{OP}$ together with information identifying the intermediate party $ID_{SP}$ to the authentication center broker 750 in a request for authentication data. The authentication center broker 750 identifies, based on the received $ID_{OP}$ and user ID, the secret key $K_i$ associated with the user 400 and then generates the (masked) authentication data according to the authentication algorithm of the invention. The remaining authentication (and proof verification) procedure essentially corresponds to the foregoing description of the invention.

In a typical scenario, the user 400 first needs to authenticate before its home operator, and thus sends its user ID to the home operator's MSC/VLR node (here acting as an intermediate party), which forwards the user ID and its own ID to the authentication center broker 750 in a request for authentication data. The authentication center broker 750 generates the authentication data required for authentication. Once the user finally has been authenticated, the MSC/VLR may store the corresponding proof information for later retrieval, if necessary, as evidence of the user authentication. If the user subsequently wants to access e.g. some web service offered by a web service provider, the user is requested to transmit its user ID and information representing the home operator's identity $ID_{OP}$ to the web service provider. If the web service provider is independent (another intermediate party) of the home operator, it may nevertheless have a relation to the home operator and query the home operator for information whether the user has been authenticated. Alternatively, the web service provider transmits the $ID_{OP}$ and the user ID to the broker 750 in its own request for authentication data, and later stores its own proof information. Correspondingly, a similar procedure may be performed for a content provider, a visited network node or any other intermediate party.

A broker acting as a general authentication center could also be employed for deriving keys for end-to-end encryption between a user and an intermediate party. In such a case, these derived keys may be kept secret from the network operator. The user may then obtain the end-to-end encryption key at e.g. subscription to the services offered by the intermediate party or at payment of utilized services.

The embodiments described above are merely given as examples, and it should be understood that the present invention is not limited thereto. For example, it should be understood that the proof evaluation stage in the authentication center is not absolutely necessary, since the mere fact that intermediate parties may be challenged to provide authentication proof information may be sufficient to prevent dishonest claims of user authentications. Further modifications, changes and improvements which retain the basic underlying principles disclosed and claimed herein are within the scope of the invention.

The invention claimed is:

1. A challenge-response based user-authentication method comprising the steps of:
    generating, at an authentication center, an expected response by a response function from a secret key and a random challenge;
    generating, at said authentication center, at least a masked expected response by a masking function in response to said expected response;
    transmitting at least said masked expected response and said random challenge to an intermediate party;
    transmitting said random challenge from the intermediate party to a user;
    generating, at said user, a response by said response function in response to said secret key and said random challenge;
    transmitting said user response to said intermediate party;
    generating, at said intermediate party, a masked user response by the same masking function as said authentication center in response to the received user response; and
    verifying, at said intermediate party, that said masked user response corresponds to said masked expected response;
    wherein the intermediate party manages authentication proof information, including at least the user response received from the user and corresponding user identification information, to enable the intermediate party to prove that the user has been authenticated;
    said intermediate party transmitting authentication proof information to the authentication center; and said authentication center verifying whether the user has been authenticated at the intermediate party based on the received proof information.

2. The method according to claim 1, wherein said authentication proof information further includes said random challenge.

3. The method according to claim 1, wherein said steps of generating a masked expected response and generating a masked user response are performed also in response to a common masking random challenge for increased security.

4. The method according to claim 3, wherein said masking random challenge is derived from said received random challenge.

5. The method according to claim 1, wherein said verifying step comprises the step of comparing the user response of said received proof information with a corresponding expected response provided by said authentication center.

6. The method according to claim 5, wherein said authentication proof information further includes said random challenge, and said method further comprises the steps of retrieving, at said authentication center, said secret key based on said user identification and re-computing said expected response from said retrieved secret key and said random challenge.

7. The method according to claim 1, further comprising the step of associating, with the intermediate party, authentication data generated for a given user by said authentication center in order to bind corresponding proof information to said intermediate party.

8. The method according to claim 7, wherein said authentication data is interrelated, at said authentication center, to identification information identifying said intermediate party, and said authentication data is subsequently compared, at said authentication center, to a representation of received proof information for verifying that said proof information is associated with said intermediate party.

9. The method according to claim 8, wherein said authentication data includes at least one of said random challenge, said expected response and a masking random challenge used for generating said masked expected response and said masked user response.

10. The method according to claim 8, wherein said authentication data includes random challenge data, and generation of said challenge data is interrelated to said intermediate party.

11. The method according to claim 10, wherein said challenge data is generated by a function that is unique for said intermediate party.

12. The method according to claim 10, wherein said challenge data is generated based on identification information identifying said intermediate party.

13. The method according to claim 1, wherein:
the step of generating at least a masked expected response at the authentication center includes generating security-related data; and
the step of transmitting at least the masked expected response and the random challenge includes encrypting the security-related data by means of the expected response before transmitting the security-related data to the intermediate party;
wherein the method further comprises:
decrypting said encrypted data at said intermediate party by means of said received user response.

14. The method according to claim 1, wherein said authentication center and said intermediate party are located in network nodes in a mobile communications system.

15. The method according to claim 1, wherein said authentication center is a broker acting as a general authentication center, or identity center.

16. A challenge-response based user-authentication system comprising:
means for generating, at an authentication center, an expected response by a response function from a key and a random challenge;
means for generating, at said authentication center, at least a masked expected response by a masking function in response to said expected response;
means for transmitting at least said masked expected response and said random challenge to an intermediate party;
means for transmitting said random challenge from the intermediate party to a user;
means for generating, at said user, a response by said response function in response to said secret key and said random challenge;
means for transmitting said user response to said intermediate party;
means for generating, at said intermediate party, a masked user response by the same masking function as said authentication center in response to said user response;
means for verifying, at said intermediate party, that said masked user response corresponds to said masked expected response;
means for managing, at said intermediate party, authentication proof information, including at least the user response received from the user and corresponding user identification, information, to enable the intermediate party to prove that the user has been authenticated;
means for transmitting authentication proof information from the intermediate party to the authentication center; and
means for verifying, at said authentication center, whether the user has been authenticated at the intermediate party based on the received proof information.

17. The system according to claim 16, wherein said authentication proof information further includes said random challenge.

18. The system according to claim 16, wherein said means for generating a masked expected response and said means for generating a masked user response operate based on a common masking random challenge for increased security.

19. The system according to claim 16, wherein said verifying means comprises means for comparing the user response of said received proof information with a corresponding expected response provided by said authentication center.

20. The system according to claim 19, wherein said authentication proof information further includes said random challenge, and said system further comprises means for retrieving, at said authentication center, said secret key based on said user identification and means for re-computing, at said authentication center, said expected response from said retrieved secret key and said random challenge.

21. The system according to claim 16, further comprising means for associating, with the intermediate party, authentication data generated for a given user by said authentication center in order to bind corresponding proof information to said intermediate party.

22. The system according to claim 16, wherein:
the means for generating at least a masked expected response at the authentication center also generates security-related data; and the means for transmitting at least the masked expected response and the random challenge also encrypts the security-related data by means of the expected response before transmitting the security-related data to the intermediate party;

wherein the system further comprises:

means for decrypting said encrypted data at said intermediate party by means of said received user response.

23. An authentication center for assisting in authentication of an associated user at an intermediate party, said authentication center comprising:

means for generating an expected response at least partly based on a secret key shared with said user;

means for masking said expected response by a masking function to generate a masked expected response;

means for transmitting said masked expected response to said intermediate party;

means for interrelating authentication data generated for a given user to identification information identifying said intermediate party; and means for comparing said authentication data with a representation of proof information received from said intermediate party for verifying that said proof information is associated with said intermediate party.

24. The authentication center according to claim 23, wherein said masking means is operable for masking said expected response based on a common masking random challenge for increased security.

25. The authentication center according to claim 24, wherein the transmitting means also transmits the common masking random challenge from said authentication center to said intermediate party.

26. The authentication center according to claim 23, wherein said authentication center is a broker acting as a general authentication center or identity center.

27. A network node, managed by a service provider, for authenticating a user associated with an authentication center, said network node comprising:

means for receiving, from said authentication center, an expected response masked by a masking function;

means for receiving a user response, corresponding to said expected response, from said user;

means for generating a masked user response by said masking function;

means for verifying that said masked user-response corresponds to said masked expected response; and means for managing, at said intermediate party, authentication proof information, including at least the user response received from the user, the random challenge, and corresponding user identification information, to enable the intermediate party to prove that the user has been authenticated.

28. The network node according to claim 27, wherein said generating means is operable for generating said masked user response based on a masking random challenge, said masking random challenge also being used by said authentication center for masking said expected response.

29. The network node according to claim 27, further comprising means for transmitting proof information from said intermediate party to said authentication center.

* * * * *